United States Patent [19]

Yonemitsu et al.

[11] 3,875,223

[45] Apr. 1, 1975

[54] PROCESS FOR PRODUCING DL-TARTARIC ACID

[75] Inventors: Eiichi Yonemitsu, Kashiwa; Hiroshi Miyamori, Matsudo; Takanari Nawata, Katsushika; Mutsuhiko Takeda, Matsudo; Yukio Sasaki, Katsushika, all of Japan

[73] Assignee: Mitsubishi Gas Chemical Company, Inc., Tokyo, Japan

[22] Filed: Jan. 7, 1974

[21] Appl. No.: 431,559

[30] Foreign Application Priority Data
Jan. 13, 1973 Japan................................ 48-6317

[52] U.S. Cl. ............................................. 260/536
[51] Int. Cl. ........................................... C07c 59/14
[58] Field of Search............................ 260/535, 536

[56] References Cited
FOREIGN PATENTS OR APPLICATIONS
1,317,907  1/1963  France .............................. 260/535

Primary Examiner—Lorraine A. Weinberger
Assistant Examiner—Paul J. Killos
Attorney, Agent, or Firm—Stewart and Kolasch, Ltd.

[57] ABSTRACT dl-Tartaric acid is produced by hydrolysis of epoxysuccinic acid in the presence of a catalyst of a metal compound of aluminum, iron, tin or bismuth. Conversion of epoxysuccinic acid as well as selectivity to dl-tartaric acid are very high.

8 Claims, No Drawings

PROCESS FOR PRODUCING DL-TARTARIC ACID

This invention relates to a process for producing dl-tartaric acid. More particularly, this invention relates to an improvement of the process for producing dl-tartaric acid by hydrolysis of epoxysuccinic acid.

dl-Tartaric acid has been widely used as, for example, food additives or industrial chemicals. It has heretofore been known to produce dl-tartaric acid by allowing hydrogen peroxide to react with maleic acid in the presence of a tungsten compound catalyst. According to this method, it is known that epoxysuccinic acid is formed as an intermediate which is then hydrolyzed to produce dl-tartaric acid. However, epoxysuccinic acid, as different from other epoxy compounds, contains an oxirane ring in the molecule which is very stable. Therefore, preparation of dl-tartaric acid by hydrolysis of this compound is not easy. In the absence of a catalyst, even after boiling of an aqueous solution of epoxysuccinic acid which is continued as long as, for example, 5 hours, only 73.8% of said compound is hydrolyzed.

As catalysts for hydrolysis of oxirane rings, acids or bases have heretofore been generally known. However, to the best of our knowledge, when sulfuric acid, for example, is used as a catalyst for the preparation of dl-tartaric acid by hydrolysis of epoxysuccinic acid, there are drawbacks such that a great amount of sulfuric acid has to be used, that it takes a long time to carry out the reaction and that the yield of dl-tartaric acid is low. On the other hand, when bases such as caustic alkalis are used as catalysts, the products are in the form of alkali salts of dl-tartaric acid and which is disadvantageous in the production of free dl-tartaric acid. Furthermore, it is generally known that a part of the dl-tartaric acid salt thus formed is further hydrolyzed into lower carboxylic acid salts such as the acetic acid salt or oxalic acid salt to result in a disadvantageous increase in byproducts and decrease in yield of the dl-tartaric acid salt (see, for example, G. Peyronel, Gazetta Chimica Italiana, vol. 81, p.177, 1951).

The object of the present invention is to provide an industrially advantageous process for producing dl-tartaric acid from epoxysuccinic acid in a very short time with good conversion as well as selectivity.

It has now been found that a certain kind of metal compounds effectively catalyzes the hydrolysis of epoxysuccinic acid. Namely, the present invention provides a process for producing dl-tartaric acid from epoxysuccinic acid, comprising incorporating a compound of aluminum, iron, tin or bismuth into an aqueous solution of epoxysuccinic acid.

The metal compound to be used in the present invention is a compound of aluminum, iron, tin or bismuth which is soluble in water or an aqueous solution of epoxysuccinic acid. Any compound may be used, so long as these metals can exist as ions in the reaction system. Among these metal compounds, inorganic acid salts such as aluminum chloride, iron chloride, iron sulfate and tin chloride and organic acid salts such as basic aluminum acetate are preferred. Above all, aluminum chloride and ferric chloride are particularly preferred, because they are high in solubility in water or an aqueous solution of epoxysuccinic acid as well as in catalytic activity. These metal compounds may be used either alone or in mixtures with each other, to catalyze the hydrolysis reaction of epoxysuccinic acid.

The concentration of the metal compound in the aqueous solution of epoxysuccinic acid may vary depending upon the concentration of the aqueous epoxysuccinic acid solution and the temperature at the time of hydrolysis, but preferably ranges from 0.01 to 3 mol %, particularly preferably from 0.1 to 1 mol % in terms of the ratio of the metal compound to epoxysuccinic acid.

The epoxysuccinic acid used as the starting material may be produced in any way. For example, it may be produced according to the known method as mentioned above by allowing hydrogen peroxide to react with maleic acid in an aqueous solution in the presence of a tungsten compound catalyst. Alternatively, it may be produced according to the method invented by the present inventors, comprising allowing hydrogen peroxide to react with acid calcium maleate in an aqueous solution in the presence of a tungsten compound catalyst to prepare acid calcium epoxysuccinate and then subjecting this acid calcium epoxysuccinate to acid decomposition. Furthermore, epoxysuccinic acid from the decomposed liquid obtained by acid decomposition of an epoxysuccinic acid salt or ester may also be used. The decomposed liquid itself may also be available. The concentration of an aqueous epoxysuccinic acid solution is not particularly limited, so long as it is a homogeneous aqueous solution at the reaction temperature. Industrially, however, it is preferred to use a concentration of 1 to 10 mol of epoxysuccinic acid per litre of water.

The reaction temperature may be the reflux temperature of an aqueous epoxysuccinic acid solution or lower. When the concentration of the metal compound in the aqueous solution of epoxysuccinic acid is within the preferred range as mentioned above, the reaction temperature may be 60°C or higher. Preferably, however, the reaction temperature is near the reflux temperature of the aqueous solution of epoxysuccinic acid, namely, from 95° to 100°C.

After being treated with an H-form cation exchange resin or without any such treatment, the reaction product thus formed is concentrated and cooled or cooled without concentration, to precipitate crystals of dl-tartaric acid which are then separated and recovered, or evaporated to dryness to obtain crystals of dl-tartaric acid.

According to the process of the present invention, dl-tartaric acid can be obtained in a very short time and in high yield. Selectivity to dl-tartaric acid from epoxysuccinic acid is also very high. Therefore, the filtrate after removal of the crystals can be recycled for re-use without any particular treatment. The present invention is also industrially advantageous in this respect.

The present invention is further illustrated with reference to the following Examples.

EXAMPLE 1

An aqueous solution having 13.2 g of epoxysuccinic acid and 0.1158 g of aluminum chloride hexahydrate dissolved in 100 g of water was refluxed for one hour under heating over an oil bath. As the result, the conversion of epoxysuccinic acid was 98.3%. The reaction mixture after the reaction contained 14.7 g of dl-tartaric acid, which corresponded to a 98.1% yield of dl-tartaric acid based on the amount of epoxysuccinic acid charged.

The reaction mixture thus prepared was treated with an H-form cation-exchange resin to remove aluminum ions and evaporated to dryness to obtain 16.8 g of crystals of dl-tartaric acid (monohydrate) with a purity of 98.1% (corresponding to 14.7 g of dl-tartaric acid containing no water of crystallization).

EXAMPLE 2

When ferric chloride, ferrous sulfate, stannous chloride, stannic chloride, bismuth trichloride or basic aluminum acetate [Al(OH)(CH$_3$COO)$_2$] is used in place of aluminum chloride, the other conditions being followed according to the procedure of Example 1, the results as shown in Table 1 were obtained.

Table 1

| Experiment No. | Metal compound Kind | Amount (g) | Conversion* of epoxy succinic acid (%) | Yield of* dl-tartaric acid based on charged epoxysuccinic acid (%) |
|---|---|---|---|---|
| 1 | FeCl$_3$·6H$_2$O | 0.1298 | 98.8 | 97.7 |
| 2 | FeSO$_4$·7H$_2$O | 0.1334 | 98.5 | 94.9 |
| 3 | SnCl$_2$·2H$_2$O | 0.1083 | 97.8 | 97.1 |
| 4** | SnCl$_4$·5H$_2$O | 0.1682 | 94.9 | 93.2 |
| 5 | BiCl$_3$ | 0.1514 | 98.4 | 93.1 |
| 6 | Al(OH)(CH$_3$COO)$_2$ | 0.0744 | 98.3 | 97.4 |

*calculated from the amount of reaction mixture produced and respective concentrations of epoxysuccinic acid and dl-tartaric acid contained therein (same in the following Example and comparative examples)
**Only in this case, the reaction time was three hours (in other cases, one hour).

EXAMPLE 3

Various aqueous solutions having predetermined amounts of epoxysuccinic acid and predetermined amounts of ferric chloride hexahydrate dissolved in 50 g of water, respectively, were allowed to react at various temperatures for one hour. The results are shown in Table 2.

Table 2

| Experiment No. | Amount of epoxysuccinic acid (g) | Amount of ferric chloride hexahydrate (g) | Reaction temperature (°C) | Conversion of epoxysuccinic acid (%) | Yield of dl-tartaric acid based on charged epoxysuccinic acid (%) |
|---|---|---|---|---|---|
| 1 | 6.6 | 0.0135 | 100 | 95.7 | 95.3 |
| 2* | 6.6 | 0.065 | 60 | 85.7 | 84.8 |
| 3 | 6.6 | 0.27 | 60 | 89.8 | 88.8 |
| 4 | 19.8 | 0.065 | 100 | 98.3 | 97.1 |

*Only in this case, the reaction time was two hours

COMPARATIVE EXAMPLE 1

An aqueous solution having 13.2 g of epoxysuccinic acid dissolved in 100 g of water was refluxed for one hour under heating over an oil bath, whereby the conversion of epoxysuccinic acid was 22.0% and the yield of dl-tartaric acid based on the amount of epoxysuccinic acid charged was 21.6%. When the solution was further refluxed under heating for an additional four hours, the conversion of epoxysuccinic acid was 73.8% and the yield of dl-tartaric acid based on the amount of epoxysuccinic acid charged was 72.5%.

COMPARATIVE EXAMPLE 2

An aqueous solution having 6.6 g of epoxysuccinic acid and 2.6 g of 95.4% sulfuric acid dissolved in 50 g of water was refluxed for one hour under heating over an oil bath, whereby the conversion of epoxysuccinic acid was 34.1% and the yield of dl-tartaric acid based on the amount of epoxysuccinic acid charged was 31.6%. When the solution was further refluxed under heating for an additional four hours, the conversion of epoxysuccinic acid was 87.5% and the yield of dl-tartaric acid based on the amount of epoxysuccinic acid charged was 81.0%.

EXAMPLE 4

An aqueous solution having 6.6 g of epoxysuccinic acid and 0.00065 g of ferric chloride hexahydrate dissolved in 50 g of water was refluxed for one hour under heating over an oil bath. As the result, the conversion of epoxysuccinic acid was 38.1% and the yield of dl-tartaric acid based on the amount of epoxysuccinic acid charged was 37.2%.

What we claim is:

1. A process for producing dl-tartaric acid, which comprises hydrolyzing epoxysuccinic acid in the presence of at least one compound selected from the group consisting of metal compounds of aluminum, iron, tin and bismuth, which is soluble in water or an aqueous solution of epoxysuccinic acid.

2. A process according to claim 1 wherein the amount of the metal compound is from 0.01 to 3 mol % in terms of the ratio of the metal compound to epoxysuccinic acid.

3. A process according to claim 1 wherein the amount of the metal compound is from 0.1 to 1 mol % in terms of the ratio of the metal compound to epoxysuccinic acid.

4. A process according to claim 1 wherein the metal compound is an inorganic or organic acid salt.

5. A process according to claim 4 wherein the metal compound is aluminum chloride or ferric chloride.

6. A process according to claim 1, wherein the epoxysuccinic acid is hydrolyzed at a temperature in the range from 60°C to the reflux temperature of an aqueous epoxysuccinic acid solution.

7. A process according to claim 1, wherein the epoxysuccinic acid is hydrolyzed at a temperature in the range from 95° to 100°C.

8. A process according to claim 1, wherein the metal compound is aluminum chloride, ferric chloride, ferrous sulfate, stannous chloride, stannic chloride, bismuth trichloride or basic aluminum acetate.

* * * * *